United States Patent [19]

Le Roux

[11] Patent Number: 5,651,116
[45] Date of Patent: Jul. 22, 1997

[54] METHOD AND APPARATUS FOR GENERATING SUMMARIES OF PREPAID INSTRUMENT TRANSACTION ACTIVITY

[75] Inventor: Jean-Yves Le Roux, Chemin des Côtes, France

[73] Assignee: Gemplus Card International

[21] Appl. No.: 501,071

[22] PCT Filed: Feb. 3, 1994

[86] PCT No.: PCT/FR94/00127

§ 371 Date: Sep. 18, 1995

§ 102(e) Date: Sep. 18, 1995

[87] PCT Pub. No.: WO94/18628

PCT Pub. Date: Aug. 18, 1994

[30] Foreign Application Priority Data

Feb. 4, 1995 [FR] France ................................ 93 01235

[51] Int. Cl.$^6$ ................................................. H01J 13/00
[52] U.S. Cl. ...................... 395/200.14; 235/380; 235/492
[58] Field of Search ..................... 235/492, 380; 395/200.14

[56] References Cited

U.S. PATENT DOCUMENTS

| | | | |
|---|---|---|---|
| 5,468,947 | 11/1995 | Danielson et al. | 235/472 |
| 5,581,708 | 12/1996 | Iijima | 395/200.14 |

FOREIGN PATENT DOCUMENTS

| | | |
|---|---|---|
| 0259659 | 3/1988 | European Pat. Off. . |
| 0273136 | 7/1988 | European Pat. Off. . |
| 2226192 | 6/1990 | United Kingdom . |

*Primary Examiner*—Harold Pitts
*Attorney, Agent, or Firm*—Nilles & Nilles, S.C.

[57] ABSTRACT

Method of communication between a processing unit associated with an applications program and portable information carriers of different types. It consists in adding a communications layer between the applications program and the carriers, so as to only one communications protocol in the applications program to access the carriers, whatever may be their type.

17 Claims, 3 Drawing Sheets

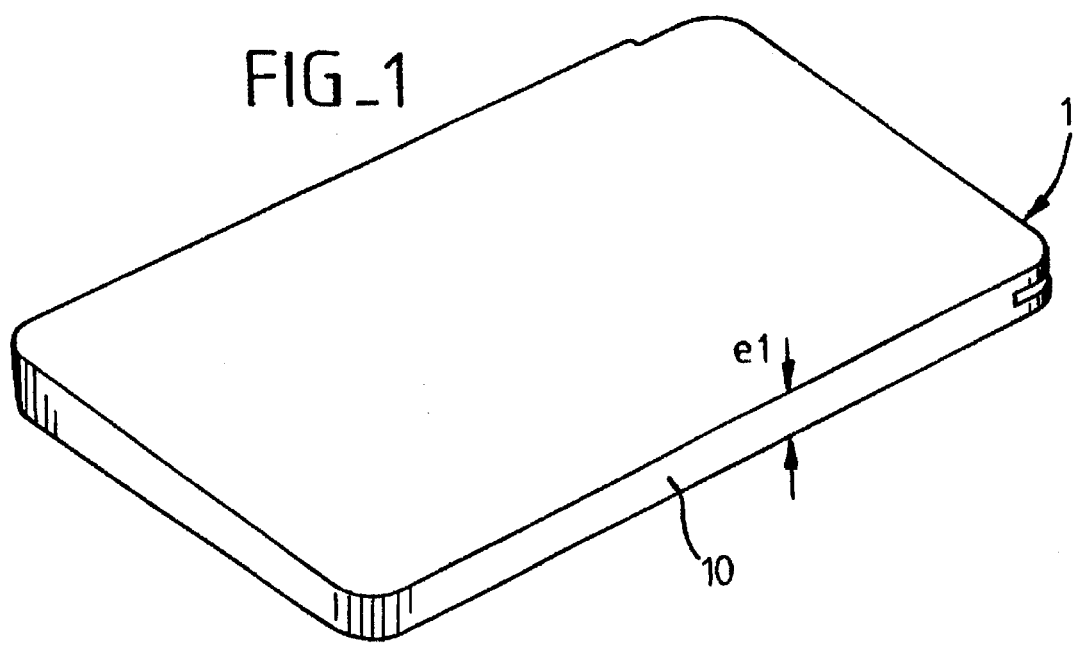
FIG_1
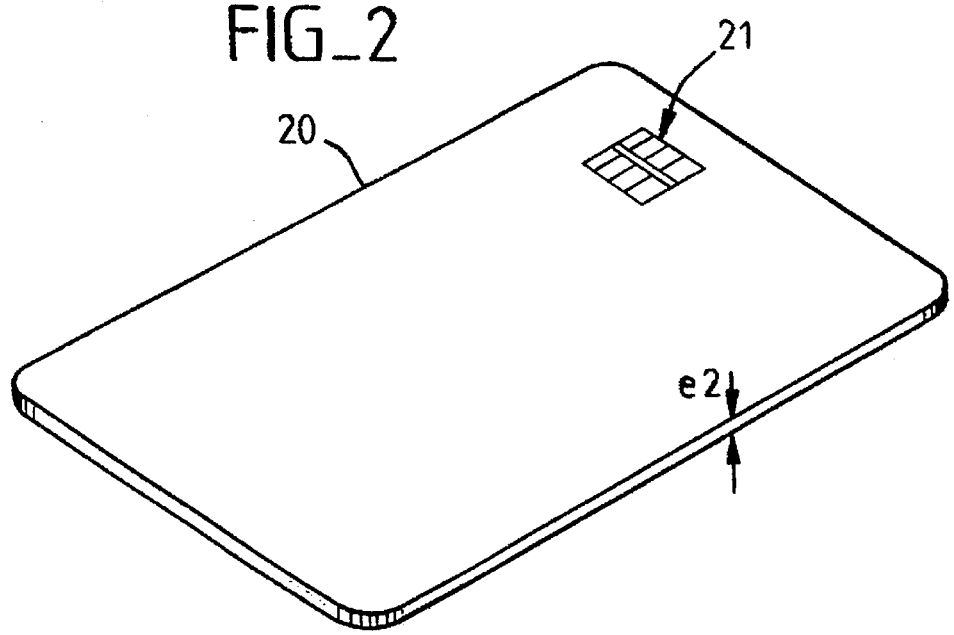
FIG_2

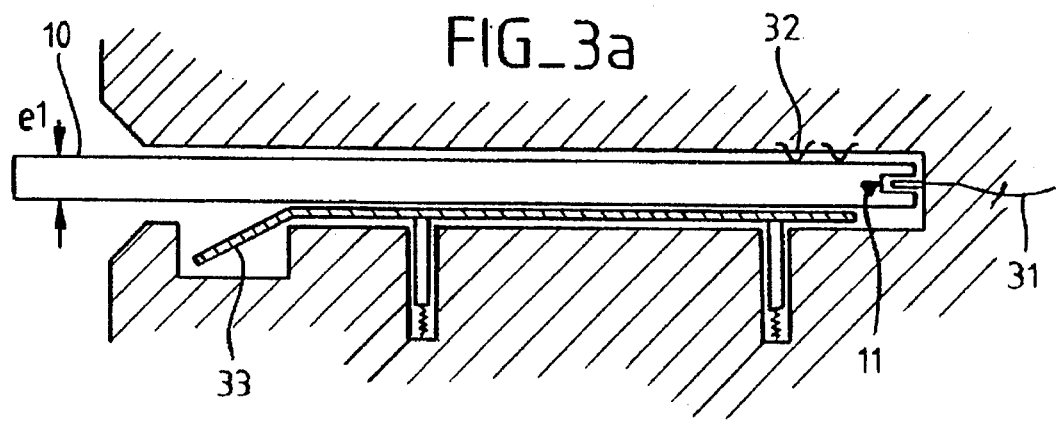
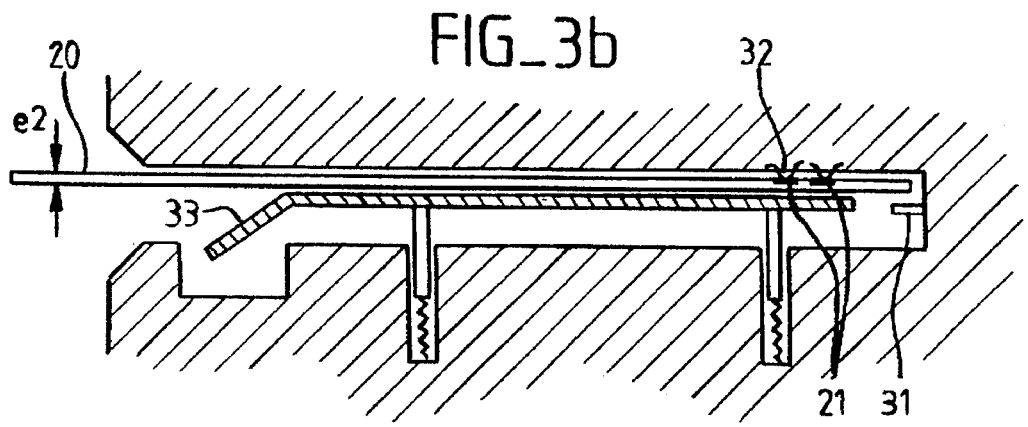
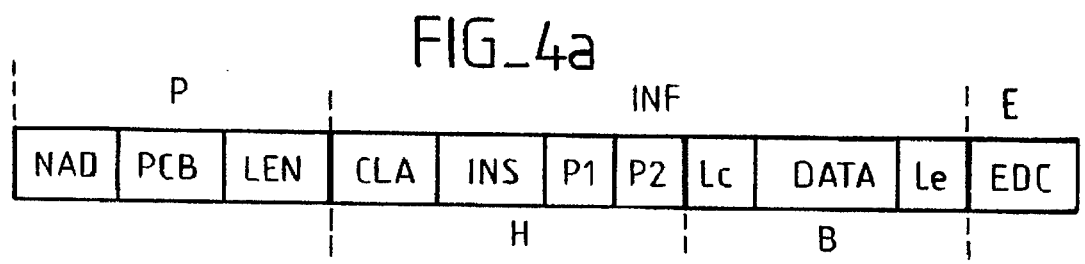
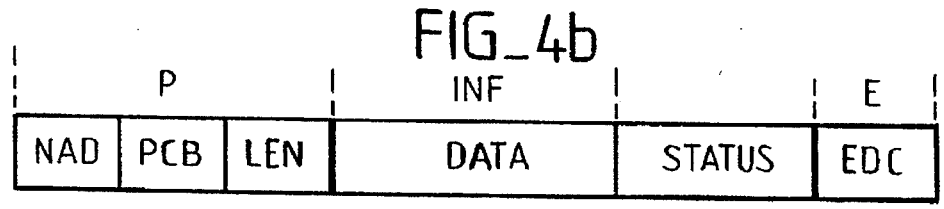

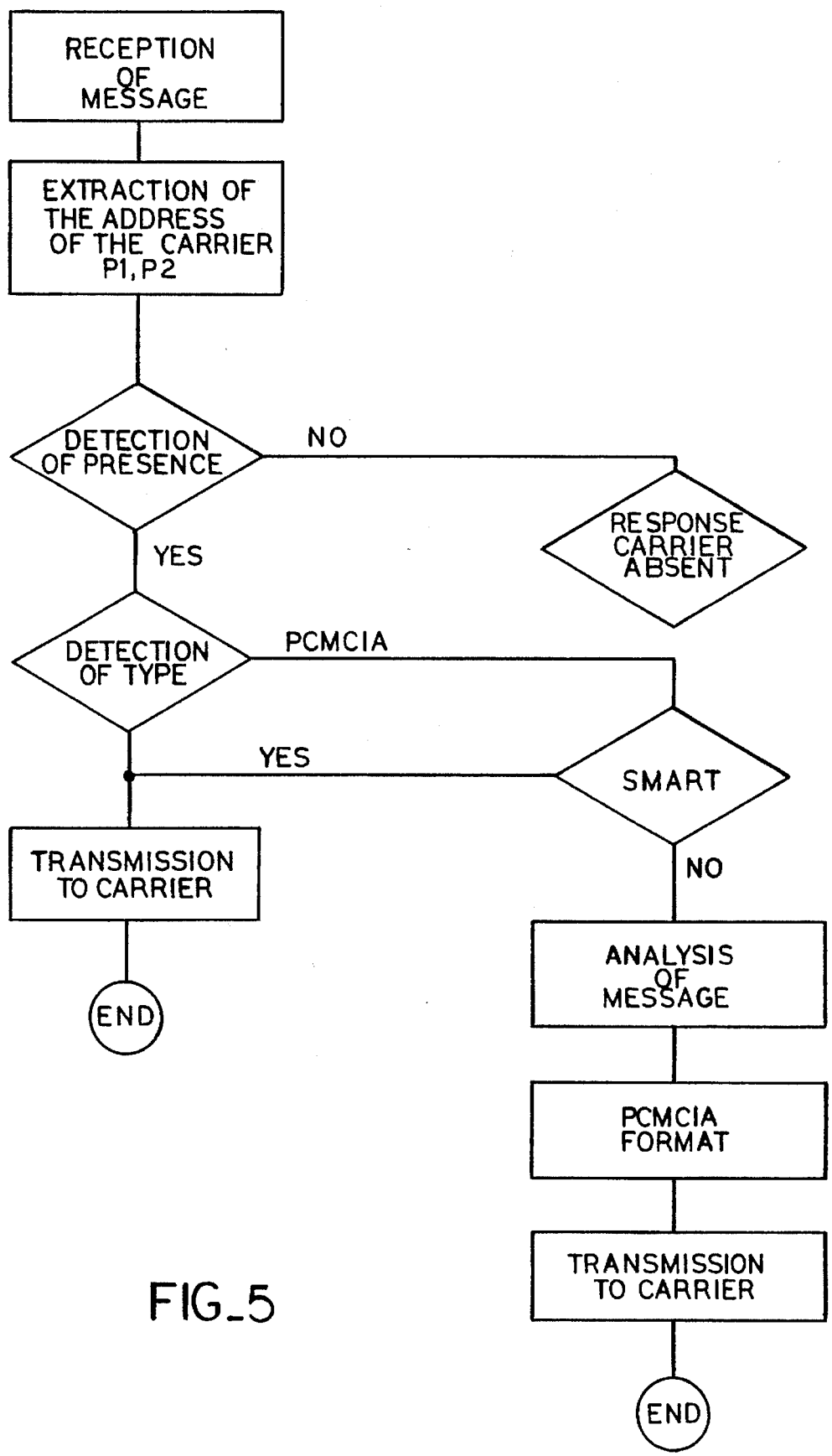
FIG_5

METHOD AND APPARATUS FOR GENERATING SUMMARIES OF PREPAID INSTRUMENT TRANSACTION ACTIVITY

BACKGROUND OF THE INVENTION

1. Field of the Invention

The invention relates to portable carriers such as mass memory cards or credit card type chip cards. It can be applied notably to microcomputers.

2. Discussion of the Related Art

Detachable mass memory cards have recently appeared as accessories of personal computers or microcomputers, especially for portable computers. They could replace diskettes and other magnetic type mass storage means in the future. They can be used as mass memories with a capacity as great as that of magnetic diskettes (with a size of about 1 million bytes). Their space requirements are no longer great since they have a credit card format with a thickness of 3 to 5 millimeters and access to them is obtained far more swiftly (several thousands of times more swiftly).

They can even be used as random-access memories for programs that can be directly performed by the personal computer. In this case, unlike in the case of magnetic mass memories, they do not have to be loaded into the random-access memory (RAM) of the PC in order to be performed thereafter. The programs that they contain can be performed directly by the personal computer.

Mass memory cards, sometimes also called PC cards, have several memory chips and a connector at the edge of the card (a female 68-pin connector according to the PCM-CIA standard by the "Personal Computer Memory Card International Association", 1030B East Duane Avenue, Sunnyvale, Calif.). The card can be plugged into a corresponding connector (the male connector of the computer). The connections are such that the memory can be addressed by the parallel input-output port of the PC, as if the memory were a magnetic mass memory, namely as if it were an extension of the random-access memory of the computer.

These plug-in cards, apart from their memory function, may provide additional functions such as, for example, functions of communication. Other cards, known as smart cards, have a microprocessor capable of performing programs contained in the RAM memory of the card by itself. It is also planned, in these smart cards, that the computer will be capable of the direct loading, into a memory of the card, of the files that can be directly performed by the microprocessor.

The memory space of these edge-connector memory cards is formatted in the same way as the magnetic diskettes, according to the operation system associated with the microcomputer. In one example, where the operating system is the well known DOS (Disc Operating System), the memory space is divided into sectors of segments. And this memory space is addressed like that of a magnetic diskette. For example, access in reading mode to the fifth sector is got by activating the associated DOS read interrupt command, with the sector number and the number of bytes to be read as arguments.

It is also possible to use control registers of a microcomputer to carry out access operations. Reference will be made, if need be, to the document "PCMCIA socket services interface specification" distributed by "Personal Computer Memory Card International Association" already referred to.

A communications protocol between these cards and an applications program of a microcomputer enables the microcomputer to gain access to the PCMCIA memory space and perform high level commands, namely commands for the initialization/configuration of the card and for the reading/writing/erasure of data.

There also exist other types of portable carriers namely chip cards with flush contacts, widely used in large-scale consumer applications such as telephone cards, cards for access to secured premises, banking cards, etc. These cards generally have only one integrated circuit chip (although it is not ruled out that they may have several of them). The contacts are no longer at the edge of the card but on one of the main plane faces of the card. The contacts are few in number, generally between six and eight. These cards are far slimmer than memory cards using the PCMCIA standard. Their thickness is about 1 millimeter, instead of 3 to 5 millimeters. They are designed to be inserted into readers that are specialized according to applications: telephone booths, turnstiles for the access cards, cash dispensers for the bank cards, etc. They have a memory space managed by a microcontroller or an integrated microprocessor.

OBJECTS AND SUMMARY OF THE INVENTION

In certain cases, the chip cards may be connected to a microcomputer, to ensure the security of its use. A chip card reader is then connected to the microcomputer.

The protocol for communications between these cards and an applications program of a microcomputer or any processing machine follows the ISO 7816-3 and 7816-4 standard. In a specified way, according to these standards and as shown in FIG. 4a, the structure of a command message with a transport layer comprises a header P, a data block INF and a checksum information element E. The header P comprises the address NAD of the reader of the chip card, the type PCB of the data block (applications data, ackowledgement data or supervision data) and the length LEN of the data block. The data block INF is itself structured as a header H and a message body B. The header contains the class of the instruction (CLA), the code of the instruction (INS) and the address in the memory space of the chip card to which access is sought (P1, P2). The body of the message includes the number of bytes (Lc) of the message, the bytes of the message (DATA) and the maximum number of bytes (Le) of the message that are expected in the response.

The class of the introduction identifies the exact structure of the message:
  without message body: type 1;
  with message body comprising the number of bytes (Lc) of the message and the message (no response expected): type 2 (for example, writing of data);
  with a message body comprising only the maximum number of bytes (Le) of the message expected in the response: type 3 (for example, reading of data);
  with a full message body: type 4.

The microcomputer can thus make the chip card carry out commands of the following type:
  reading/writing/erasure of data elements in an elementary file;
  verification of electronic signatures;
  enciphering, deciphering.

In response, the chip card sends back a message in which the structure of the transport layer is identical to that of the command message and the data block INF includes the bytes of the response (DATA) and a status code (STATUS), the total number of bytes of the data block being given by the length LEN in the header P. This structure of the response message is shown in FIG. 4b.

It has been thought; according to the invention, that it would be useful to make the interface protocols uniform with the chip cards and the PCMCIA type cards in order to facilitate their combined use.

To this end, there has already been proposed a card reader for microcomputers having a card insertion slot and means for connection, either to a connector at the edge of the memory card or to flush contacts of a chip card. This reader thus has a first connector placed at the bottom of the insertion slot to receive an edge-connector memory card and a second connector for flush-contact chip cards, placed on one of the main faces of the slot.

To further facilitate widespread use of the flush-contact chip cards, the invention proposes a method of communication that enables a microprocessor to gain access without distinction to a reader of edge-connector memory cards or to a reader of flush-contact chip cards, without any need to worry about the type of portable carrier to which access is thus gained.

According to the method of the invention, an applications program in the microcomputer uses only one communications protocol between the applications program and the portable carriers. Conversely, the messages that the applications program receives from these carriers follow the same communications protocol, by means of this communications layer.

Such a method enables a user to gain access very easily to the different types of cards, since it makes this type transparent to the user.

According to the invention, the method of communication consists in adding a communications layer between an applications program of the microcomputer and different types of information carriers, in order to use only one communications protocol to gain access to the carriers, whatever their type may be. The communications layer implements chiefly the following steps, upon reception of a message from the applications program:

the extraction, from the message, of the address of the reader of the carrier;

the detection of the presence of a carrier at this address and the identification of the corresponding type;

should the carrier be the flush-contact type of chip card or the edge-connector type of smart memory card, direct transmission of the message to the carrier;

should the carrier be the edge-connector type of memory card, analysis of the message and encoding to make it compatible with the carrier.

BRIEF DESCRIPTION OF THE DRAWINGS

Other features and advantages are presented in the following description by way of an indication that in no way restricts the scope of the invention, made with reference to the appended drawings and documents, wherein:

FIG. 1 illustrates an edge-connector memory card;

FIG. 2 illustrates a flush-contact chip card;

FIGS. 3a and 3b show a two-standard reader into which the following are introduced:

(a) a PCMCIA card;

(b) a chip card;

FIGS. 4a and 4b respectively show the structure of a command message and a response message with a transport layer according to the ISO 7816-3 and ISO 7816-4 standards; and FIG. 5 is a flow chart of the method according to the invention.

DESCRIPTION OF THE PREFERRED EMBODIMENT

In FIG. 1, a PCMCIA type card 10 is shown. This card for microcomputers is a plug-in card. It has an edge conductor 11. This card has a thickness e1 of about 3 to 5 millimeters for a width of about 5 cm and a length of about 8 cm. The term used hereinafter shall be PCMCIA card.

In FIG. 2, a chip card type of card 20 is shown. Its thickness e2 is smaller than 1 millimeter. This chip card has a flush-contact connector 21 placed on one of the main plane faces of the card. This connector is conventionally formed by a small number of individual contact surfaces (generally six to eight of them) placed side by side.

In the case of the PCMCIA card, the contact with the exterior is achieved by the plugging in of 68 male pins into female recesses, as shown in FIG. 3a.

In the case of the chip card, and as shown in FIG. 3b, this contact with the exterior is got by contact blade pressure on the six to eight individual contact surfaces of the card. The blades may be in the form of brushes that rub against the contact surfaces of the connector 21, or in the form of bosses 32 that press on these surfaces.

A microcomputer having the appropriate readers can thus get connected to PCMCIA cards or to chip cards. Better still, it may have a combined reader of the type shown in FIGS. 3a and 3b, which can read either a PCMCIA card or else a chip card. It has chiefly a slot 30 for the insertion of a card, a first connector 31 at the bottom of the insertion slot to receive a edge-connector memory card (FIG. 3a) and a second connector 32 for flush-contact chip cards placed on one of the main faces of the slot (FIG. 3b). Removable means, in the example means using drawback springs (42, 44, 46), are placed within the slot so as to tend to push a flush-contact card 20; introduced into the slot, against the flush-contact connector, these means being pushed back against their drawback spring during the insertion of an edge-connector card 10. FIG. 3a thus shows an edge-connector card 10 inserted into the slot while FIG. 3b shows a flush-contact card 20 inserted into the slot. The movable means using drawback springs comprise, in the example shown in FIGS. 3a and 3b, a plate 33 parallel to the main faces of the slot mounted on pillars 46 that can sink into blind holes 44 pierced in one of the main faces of the slot, drawback springs 42 being designed to counter the sinking of the pillars into these blind holes.

The plate is preferably provided on the input side of the slot with a ramp inclined towards the main face opposite the one bearing the flush-contact connector, to facilitate the insertion of the cards into the slot between the plate and the main face bearing the flush-contact connector.

However, the microcomputer seeking to gain access to these different portable carriers inserted into slots of chip card type, PCMCIA type or combined card type readers must use the appropriate communications protocol.

In particular, the PCMCIA card follows the communications protocol associated with the operating system of the microcomputer, like any mass memory. The chip card for its part follows a specific protocol according to the ISO standards 7816-3 and 7816-4 already described with reference to FIGS. 4a and 4b which show the structure of the control and response message with the transport layer according to these standards.

In the invention, a method of communication will enable the microcomputer to process these different portable carriers without distinction.

An applications program launched by the microcomputer, according to the invention, uses a single communications protocol with the portable carriers. In one example, it is the communications protocol of the chip cards that is chosen.

A communications layer between the applications program and a detachable carrier receives the commands of the applications program according to this communications protocol.

It may be recalled that the structure of a command message meeting the ISO standards comprises (FIG. 4a):
- a header P containing notably the address NAD of the addressee reader;
- a data block INF containing the command;
- a checksum information element E.

The communications layer according to the invention then implements the following steps:
- the extraction of the address NAD of the addressee reader;
- the detection of the presence of a card at this address;
- if a card is present and if it is of the chip card type, the direct transmission of the command message to the reader;
- if a card is present and if it is of the PCMCIA card type, analysis of the data block INF containing the command to put it in the corresponding format;
- if there is no card, the sending of a response message, "card absent", to the applications program.

The detection of the presence of a card as well as the determining of its type can be done by mechanical, optical or magnetic means. For example, a small electrical contactor is actuated by the connection of the card to its connector.

If the card is of the PCMCIA type, the analysis of the command then consists in extracting the different information elements from the data block INF (FIG. 4a) containing the command, in order to deduce therefrom the contents of the different parameters of this command. The data block INF has the following form:

| H | | | | B | | |
|---|---|---|---|---|---|---|
| CLA | INS | P1 | P2 | Lc | DATA | Le | with a header H formed by elements referenced CLA, INS, P1, P2 and a message body B formed by the elements referenced Lc, DATA, Le, where:

CLA: is the type of the instruction
INS: is the code of the instruction
P1, P2: give the basic address of the memory element to which access is sought
Lc: is the number of bytes of the DATA element
DATA: are the data elements transmitted
Le: is the maximum number of bytes expected in the response.

The instruction may be of four types (CLA parameters).

Type 1 corresponds to a message formed solely by a header (example of an instruction=initialization of the card);

Type 2 corresponds to a message comprising the header and the elements Lc and DATA (example of an instruction: writing);

Type 3 corresponds to a message comprising the header and the element Le (example of an instruction: reading);

Type 4 corresponds to the full message (example of an instruction: reading/writing).

If the detachable carrier addressed relates to a PCMCIA type card, the communications layer will analyze the message in the ISO format to translate it into the PCMCIA format.

In one example, for a read command using the ISO format, the field CLA indicates that the instruction is of the type 3. The data block INF is formed consequently by the following fields:

| H | | | | B |
|---|---|---|---|---|
| CLA | INS | P1 | P2 | Le |

It is the parameters P1, P2 that give the operating system the basic address of the memory element to be read and it is the field Le that gives the number of bytes to be read.

The parameters of the corresponding PCMCIA command, when for example the PCMCIA card is formatted in the DOS system, are then:
- the instruction code given by the field INS,
- the sector number given by the fields P1, P2,
- the number of bytes to be read given by the field Le.

For example, in the DOS system, if the instruction code that is in the field INS is the reading code, the system carries out the read command on the basis of the sector number given by P1 and P2 and the number of bytes to be read given by Le.

With regard to the responses, if we look again at the example of the reading instruction, the PCMCIA card sends back the Le bytes read and the status code.

The communications layer according to the invention therefore receives these Le response bytes from the PCMCIA card and the status code. It presents these Le bytes and the status code according to the response format with the transport layer to send them back to the applications program of the microcomputer, namely according to the following format:

| P | | | INF | | E |
|---|---|---|---|---|---|
| NAD | PCB | LEN | DATA | STATUS | EDC | where NAD and PCB are the same as in the control message and LEN is equal to Le: number of bytes of the response DATA.

Thus, for each instruction, the communications layer makes it possible, depending on the type of instruction, to make a search in the different fields of the data block INF of the command for the information elements necessary if the operating system of the microcomputer is to be capable of carrying out the instruction that it recognizes.

In another example, where it is sought to perform a write operation, the structure of the message will be:

| P | | | | INF | | | | | E | |
|---|---|---|---|---|---|---|---|---|---|---|
| NAD | PCB | LEN | | CLA | INS | P1 | P2 | | LC | DATA | | EDC |

If the address NAD designates a PCMCIA card reader, the number of the sector to be written in (P1, P2), the number of data elements (Lc) and the data elements (DATA) to be written therein are extracted from the body of the message INF in order to be transmitted to the PCMCIA card. This card simply sends back a status code indicating a properly performed operation or an error of performance to the communications layer of the invention. This layer then presents a response according to the requisite format of response with a transport layer, giving herein:

| P | | | | INF | | E | |
|---|---|---|---|---|---|---|
| NAD | PCB | LEN | | STATUS | | EDC | where LEN is then equal to the number of bytes of the status code STATUS.

According to the invention, regardless of the type of detachable carrier used in the microcomputer, an applications program uses only one communications protocol.

Should the detachable carrier be a smart PCMCIA card, it is provided that the message read will be sent directly in the ISO format. The determining of the smart nature of the PCMCIA cards is then done, for example, by the reading of a particular memory address of the PCMCIA card.

Thus advantageously, a single communications protocol is obtained whatever the type of carrier and whatever the type of reader into which the carrier is inserted.

I claim:

1. A method of communicating between a microcomputer and different integrated circuit cards, the microcomputer being associated with an application program which uses functions borne by the different integrated circuit cards, the different integrated circuit cards being inserted in a reader connected to the microcomputer, and the different integrated circuit cards utilizing different communication protocols, the method comprising the steps of adding a communication layer between the application program and the integrated circuit cards; and using only a single communication protocol to access the different integrated circuit cards which utilize different communication protocols, the using step being performed by the application program and being made possible by the adding step.

2. A method of communicating according to claim 1, wherein the communication layer implements the following steps upon reception of a message from the application program:

extracting, from the message, an address of a reader;

detecting the presence of an integrated circuit card at the reader address and identifying the corresponding type;

and, should the integrated circuit card be a flush-contact type of chip card or an edge-connector type of smart memory card, directly transmitting the message to the integrated circuit card;

and, should the integrated circuit card be an edge-connector type of memory card, analyzing the message and encoding the message to make the message compatible with the integrated circuit card.

3. A method of communicating according to claim 2, wherein the communication layer implements the following steps, upon reception of a message from the integrated circuit card:

identifying the type of integrated circuit card;

and, should the integrated circuit card be the flush-connect type of chip card or the edge-connector type of smart memory card, directly transmitting the message to the application program;

and, should the integrated circuit card be the edge-connector type of memory card, analyzing the message and encoding the message to make the message compatible with the application program.

4. A method of communicating according to claim 2, wherein the reader comprises two types of connectors enabling the reader to receive either a flush-contact chip card or an edge-connector memory card, wherein the detecting step includes reading an information of presence on each of the connectors, thus identifying the type of integrated circuit card that has been introduced into the reader.

5. A method of communicating according to claim 4 wherein, when the identified type is the edge-connector memory card, a reading is done at the particular address of the integrated circuit card to determine if the integrated circuit card is smart or not smart.

6. A method of communicating according to claim 3, wherein the reader comprises two types of connectors enabling the reader to receive either a flush-contact chip card or an edge-connector memory card, and wherein the detecting step includes reading an information of presence on each of the connectors, thus identifying the type of integrated circuit card that has been introduced into the reader.

7. A method of communicating according to claim 6 wherein, when the identified type is the edge-connector memory card, a reading is done at the particular address of the integrated circuit card to determine if the integrated circuit card is smart or not smart.

8. A communication system comprising:

a first integrated circuit card, the first integrated circuit card being one of a flush-contact type of chip card and an edge-connector type of smart memory card, the first integrated circuit card utilizing a first communication protocol;

a second integrated circuit card, the second integrated circuit card being an edge-connector type of memory card, the second integrated circuit card utilizing a second communication protocol, the second communication protocol being different than the first communication protocol;

a microcomputer, the microcomputer further comprising
   at least one card reader adapted for receiving the first and second integrated circuit cards,
   an application program, the application program utilizing only a single communication protocol,
   a communication layer, the communication layer defining means for reformatting messages back and forth between the single communication protocol and at least one of the first and second communication protocols, the means for reformatting enabling the application program to utilize only the single communication protocol to communicate with both the first and second integrated circuit cards.

9. A communication system according to claim 8, wherein the single communication protocol is the same as the first communication protocol, wherein the communication layer relays messages directly between the application program and the first integrated circuit card without reformatting, and wherein the means for reformatting reformats messages back and forth between the single communication protocol and the second communication protocol.

10. A communication system according to claim 8, wherein the first integrated circuit card is the flush-contact type of chip card, and wherein the at least one card reader is just one card reader which is adapted for non-simultaneously receiving both the first and second integrated circuit cards.

11. A communication system according to claim 10,
wherein the one card reader comprises two types of connectors which enable the one card reader to receive either a flush-contact chip card or an edge-connector memory card, and
wherein each of the two types of connectors implement information elements which indicate type of card received by the one card reader.

12. A communication system according to claim 8, wherein the communication layer further defines means for reading an address of an edge-connector memory card to determine whether the edge-connector memory card is smart or not smart.

13. A communication system according to claim 8, wherein the communication layer further defines means for extracting an address of a reader to which a message is directed in order to determine whether the message should be reformatted, the address being extracted from the message.

14. A method of communicating between a microcomputer and a plurality of integrated circuit cards including first, second and third integrated circuit cards, the method comprising the steps of
executing an application program at the microcomputer, the application program communicating according to a single communication protocol;
receiving a first plurality messages at a communication layer, the first plurality of messages being received from the plurality of integrated circuit cards, the first plurality of messages being intended for the application program, the step of receiving the first plurality of messages including
receiving a first message from the first integrated circuit card and identifying the first integrated circuit card as being a flush-contact type of chip card, and in response directly transmitting the message to the application program in the format of the single communication protocol,
receiving a second message from the second integrated circuit card and identifying the second integrated circuit card as being an edge-connector type of smart memory card, and in response directly transmitting the message to the application program in the format of the single communication protocol,
receiving a third message from the third integrated circuit card and identifying the third integrated circuit card as being an edge-connector type of memory card, the third message being sent utilizing a protocol which is different than the single communication protocol, and in response reformatting the message so as to be compatible with the single communication protocol, and then transmitting the message to the application program;
receiving a second plurality messages at a communication layer, the second plurality of messages being received from the application program, the second plurality of messages being intended for the plurality of integrated circuit cards, the step of receiving a second plurality of messages including
receiving a fourth message from the application program and identifying the fourth message as being intended for the flush-contact type of chip card, and in response directly transmitting the message to the flush-contact type of chip card;
receiving a fifth message from the application program and identifying the fifth message as being intended for the edge-connector type of smart memory card, and in response directly transmitting the message to the edge-connector type of smart memory card;
receiving a sixth message from the application program and identifying the sixth message as being intended for the edge-connector type of memory card, and in response reformatting the message so as to be compatible with the different protocol, and then transmitting the message to the edge-connector type of memory card; and whereby the steps of receiving first and second pluralities of messages are performed
such that the application program always uses the single communication protocol to communicate with the plurality of integrated circuit cards which do not all use the same single communication protocol.

15. A method of communicating according to claim 14,
wherein the microcomputer comprises a reader having two types of connectors to enable the reader to receive either a flush-contact chip card or an edge-connector memory card, and
wherein, during the step of receiving the first plurality of messages, the identifying steps are performed by reading information elements implemented by way of each of the two types of connectors.

16. A method of communication according to claim 15 wherein, when an integrated circuit card is identified as an edge-connector memory card, a reading is done at an address of the edge-connector memory card to determine whether the edge-connector memory card is smart or not smart.

17. A method of communication according to claim 14 wherein, during the step of receiving a second plurality of messages, the identifying steps are performed by extracting an address of a reader to which the respective message is directed.

* * * * *